US012700164B2

(12) United States Patent
Zhu et al.

(10) Patent No.: US 12,700,164 B2
(45) Date of Patent: Aug. 4, 2026

(54) METHOD FOR GENERATING IMAGE HAVING METAL TEXTURE, AND MODEL TRAINING METHOD

(71) Applicant: Lemon Inc., Grand Cayman (KY)

(72) Inventors: Yizhe Zhu, Los Angeles, CA (US);
Bingchen Liu, Los Angeles, CA (US);
Chunpong Lai, Los Angeles, CA (US);
Xiao Yang, Los Angeles, CA (US);
Xiaohui Shen, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 102 days.

(21) Appl. No.: 18/723,339

(22) PCT Filed: Dec. 14, 2022

(86) PCT No.: PCT/SG2022/050904
§ 371 (c)(1),
(2) Date: Jun. 21, 2024

(87) PCT Pub. No.: WO2023/121560
PCT Pub. Date: Jun. 29, 2023

(65) Prior Publication Data
US 2025/0061641 A1 Feb. 20, 2025

(30) Foreign Application Priority Data

Dec. 22, 2021 (CN) .......................... 202111580389.8

(51) Int. Cl.
G06T 7/00 (2017.01)
G06T 7/11 (2017.01)
(Continued)

(52) U.S. Cl.
CPC ............... G06T 15/04 (2013.01); G06T 7/11 (2017.01); G06T 7/74 (2017.01); G06T 11/10 (2026.01);
(Continued)

(58) Field of Classification Search
None
See application file for complete search history.

(56) References Cited

U.S. PATENT DOCUMENTS

2014/0099027 A1 4/2014 Watanabe et al.
2019/0108646 A1* 4/2019 Wang ........................ G06T 7/70
(Continued)

FOREIGN PATENT DOCUMENTS

CN 107945244 A 4/2018
CN 110753264 A 2/2020
(Continued)

OTHER PUBLICATIONS

Zeng et al. "CN 110753264A Translation". (Year: 2020).*
(Continued)

*Primary Examiner* — Zhihan Zhou
(74) *Attorney, Agent, or Firm* — BakerHostetler

(57) ABSTRACT

The present disclosure provides a method of generating an image with metallic texture, and a method of training a metallic texture image generation model. The method of generating an image with metallic texture includes: acquiring a first video; and inputting the first video into a pre-trained metallic texture image generation model to obtain a second video. Each frame of images in the second video is an image with metallic texture. The metallic texture image generation model is trained based on a plurality of first sample images and second sample images with metallic texture corresponding to each first sample image.

20 Claims, 4 Drawing Sheets

(51) Int. Cl.

| | | |
|---|---|---|
| *G06T 7/73* | (2017.01) |
| *G06T 11/10* | (2026.01) |
| *G06T 15/04* | (2011.01) |
| *G06V 10/00* | (2022.01) |
| *G06V 10/77* | (2022.01) |
| *G06V 10/80* | (2022.01) |
| *G06V 40/16* | (2022.01) |

(52) U.S. Cl.
CPC ........ *G06V 10/7715* (2022.01); *G06V 10/806* (2022.01); *G06V 40/171* (2022.01); *G06T 2207/10016* (2013.01); *G06T 2207/20081* (2013.01); *G06T 2207/30201* (2013.01); *G06T 2210/62* (2013.01)

(56) References Cited

U.S. PATENT DOCUMENTS

| | | |
|---|---|---|
| 2020/0302180 A1 | 9/2020 | Zhang et al. |
| 2021/0365710 A1 | 11/2021 | Zhu et al. |
| 2022/0198691 A1* | 6/2022 | Chen ..................... G06V 10/25 |
| 2023/0401682 A1* | 12/2023 | Hu ....................... G06V 10/774 |

FOREIGN PATENT DOCUMENTS

| | | |
|---|---|---|
| CN | 110889381 A | 3/2020 |
| CN | 111931908 A | 11/2020 |
| CN | 112989904 A | 6/2021 |
| CN | 112991150 A | 6/2021 |
| CN | 112991358 A | 6/2021 |
| CN | 113642491 A | 11/2021 |

OTHER PUBLICATIONS

Ye et al. "Interactive Curation of Datasets for Training and Refining Generative Models". (Year: 2019).*
China Patent Application No. 202111580389.8; Registration Notification; dated Aug. 11, 2025; 8 pages.
International Patent Application No. PCT/SG2022/050904; Int'l Search Report; dated Jul. 17, 2023; 3 pages.
Morrical et al.; "NViSII: A Scriptable Tool for Photorealistic Image Generation"; Synthetic Data Generation Workshop (SDG) at ICLR; 2021; 12 pages.
Song et al.; "AgileGAN: Stylizing Portraits by Inversion-Consistent Transfer Learning"; ACM Trans. Graph; vol. 37 No. 4; Aug. 2021; 13 pages.
Liu B., et al., "Self-Supervised Sketch-to-Image Synthesis," Computer Vision and Pattern Recognition (cs.CV), arXiv:2012.09290v2, Dec. 22, 2020, 18 pages.
Notice of First Examination Opinion for Chinese Application No. 202111580389.8, mailed Dec. 13, 2024, 13 pages.
Peng Yifan., et al., "A Stylized Method for Facial Cartoon Based on Feature Tracking and Rending," Computer Technology and Development, vol. 19 Issue 02, Feb. 10, 2009. 4 pages (contains English Abstract).

* cited by examiner

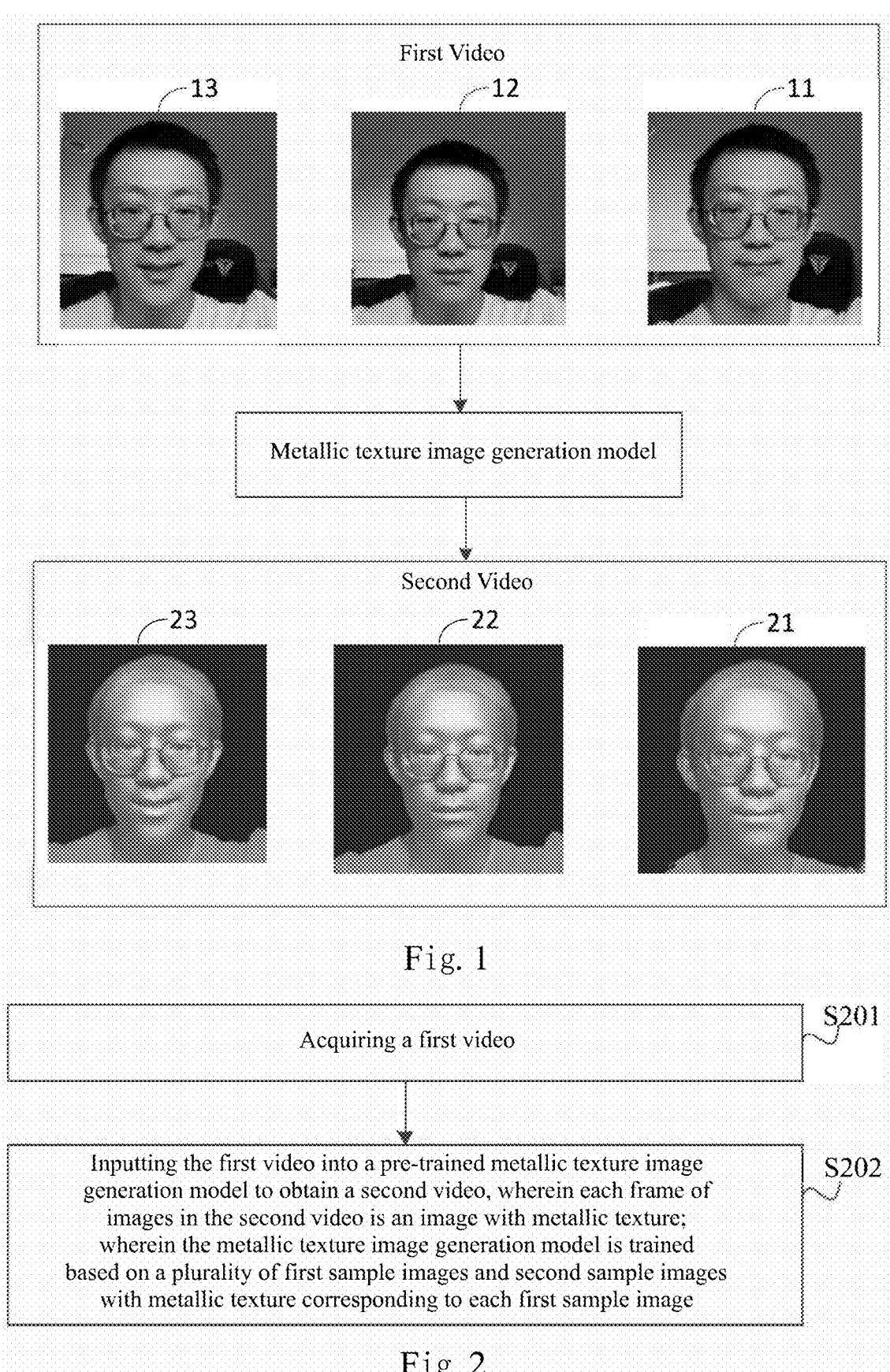

Fig. 1

Acquiring a first video — S201

Inputting the first video into a pre-trained metallic texture image generation model to obtain a second video, wherein each frame of images in the second video is an image with metallic texture; wherein the metallic texture image generation model is trained based on a plurality of first sample images and second sample images with metallic texture corresponding to each first sample image — S202

Fig. 2

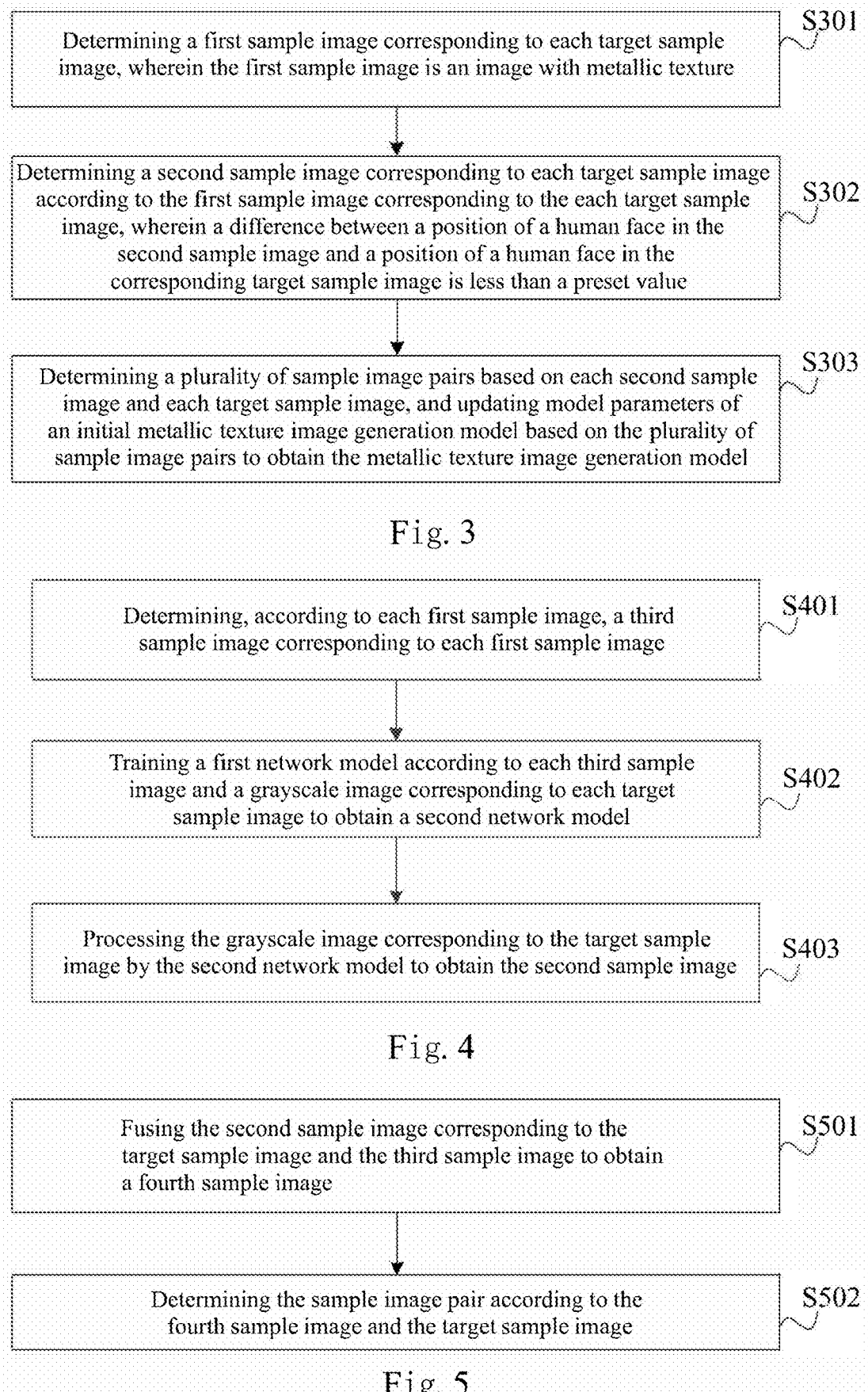

Determining a first sample image corresponding to each target sample image, wherein the first sample image is an image with metallic texture — S301

Determining a second sample image corresponding to each target sample image according to the first sample image corresponding to the each target sample image, wherein a difference between a position of a human face in the second sample image and a position of a human face in the corresponding target sample image is less than a preset value — S302

Determining a plurality of sample image pairs based on each second sample image and each target sample image, and updating model parameters of an initial metallic texture image generation model based on the plurality of sample image pairs to obtain the metallic texture image generation model — S303

Fig. 3

Determining, according to each first sample image, a third sample image corresponding to each first sample image — S401

Training a first network model according to each third sample image and a grayscale image corresponding to each target sample image to obtain a second network model — S402

Processing the grayscale image corresponding to the target sample image by the second network model to obtain the second sample image — S403

Fig. 4

Fusing the second sample image corresponding to the target sample image and the third sample image to obtain a fourth sample image — S501

Determining the sample image pair according to the fourth sample image and the target sample image — S502

Fig. 5

METHOD FOR GENERATING IMAGE HAVING METAL TEXTURE, AND MODEL TRAINING METHOD

CROSS-REFERENCE TO RELATED APPLICATION

This application is a national phase application of International Patent Application No. PCT/SG2022/050904, filed on Dec. 14, 2022, which claims the priority to and benefits of the Chinese Patent Application No. 202111580389.8, filed on Dec. 22, 2021. All the aforementioned patent applications are hereby incorporated by reference in their entireties.

TECHNICAL FIELD

The present disclosure relates to the technical field of image processing, and in particular, to a method of generating an image with metallic texture, and a training method of a model.

BACKGROUND

Metallization of an image refers to imparting metallic texture to the image such that the image looks like a metal sculpture.

In a related art, in order to realize metallization of an image, a golden color rendering method based on facsimile estimation is generally employed, which first requires facsimile estimation of the facial image and then golden rendering of the facial image based on the estimated facsimile.

In the related art, the golden color rendering method based on facsimile estimation requires a large amount of computation, resulting in poor real-time performance for golden rendering of images.

SUMMARY

The present disclosure provides a method of generating an image with metallic texture and a training method of a model for solving the poor real-time problem in golden rendering of images.

In a first aspect, the present disclosure provides a method of generating an image having a metallic texture, including:

acquiring a first video; and inputting the first video into a pre-trained metallic texture image generation model to obtain a second video, wherein each frame of images in the second video is an image with metallic texture;

wherein the metallic texture image generation model is trained based on a plurality of first sample images and second sample images with metallic texture corresponding to each first sample image.

Optionally, the metallic texture image generation model is trained based on a plurality of sample image pairs;

the plurality of sample image pairs are determined based on a plurality of second sample images and a plurality of target sample images;

the plurality of second sample images are determined based on the first sample image; and the first sample image is determined based on the target sample image.

Optionally, the second sample image is obtained by inputting a grayscale image corresponding to the target sample image into a second network model;

the second network model is obtained by training the first network model based on a third sample image and the grayscale image corresponding to the target sample image; and the third sample image is determined based on the first sample image.

Optionally, the third sample image is based on an alignment of second facial keypoints in the first sample image and first facial keypoints in the target sample image.

Optionally, the sample image pair is derived based on a fourth sample image and the target sample image; and the fourth sample image is obtained by fusing the second sample image and the third sample image.

Optionally, the fourth sample image is obtained by fusing the second sample image and the corresponding third sample image based on a position of a human face and a first mask image; and the position of the human face and the first mask image are obtained by performing a human face segmentation on the target sample image.

Optionally, the fourth sample image is obtained by fusing the second sample image and the corresponding third sample image based on the position of the human face and a second mask image; and the second mask image is obtained by performing a morphological manipulation process and/or a Gaussian blur process on the first mask image.

Optionally, the sample image pair is derived based on the second sample image and a processed image; and the processed image is obtained by performing an attribute information adjustment process on the target sample image.

Optionally, the second network model includes a plurality of third network models resulting from training the first network model;

the second sample image is obtained by performing a transparency blending process on a plurality of fifth sample images; and the plurality of fifth sample images are obtained by processing the grayscale image by the plurality of third network models, respectively.

In a second aspect, the present disclosure provides a method of training a metallic texture image generation model, including:

determining a first sample image corresponding to each target sample image, wherein the first sample image is an image with metallic texture;

determining a second sample image corresponding to each target sample image according to the first sample image corresponding to each target sample image, wherein a difference between a position of a human face in the second sample image and a position of a human face in the corresponding target sample image is less than a preset value; and determining a plurality of sample image pairs based on each second sample image and each target sample image, and updating model parameters of an initial metallic texture image generation model based on the plurality of sample image pairs to obtain the metallic texture image generation model.

Optionally, determining the second sample image corresponding to the target sample image according to the first sample image includes:

determining, according to each first sample image, a third sample image corresponding to each first sample image, wherein a difference between a position of a human face in the third sample image and the position of the human face in the target sample image is less than a difference between a position of a human face in the first sample image and the position of the human face in the target sample image;

training a first network model according to each third sample image and a grayscale image corresponding to each target sample image to obtain a second network model; and processing the grayscale image corresponding to the target sample image by the second network model to obtain the second sample image.

Optionally, determining, according to the first sample image, the third sample image corresponding to the first sample image includes:

extracting a plurality of first facial keypoints in the target sample image and a plurality of second facial keypoints in the first sample image, respectively; and aligning second facial keypoints in the first sample image with first facial keypoints in the target sample image to obtain the third sample image.

Optionally, determining the sample images pairs based on the second sample image and the target sample image includes:

fusing the second sample image and the third sample image to obtain a fourth sample image; and determining the sample image pair according to the fourth sample image and the target sample image.

Optionally, the fusing the second sample image and the third sample image to obtain the fourth sample image includes:

performing a human face segmentation on the target sample image to obtain a position of a human face and a first mask image; and fusing the second sample image and the corresponding third sample image according to the position of the human face and the first mask image to obtain the fourth sample image.

Optionally, fusing the second sample image and the corresponding third sample image according to the position of the human face and the first mask image to obtain the fourth sample image includes:

performing a morphological manipulation process and/or a Gaussian blur process on the first mask image to obtain a second mask image; and fusing the second sample image and the corresponding third sample image according to the position of the human face and the second mask image to obtain the fourth sample image.

Optionally, determining the sample image pair based on the second sample image and the target sample image includes:

performing an attribute information adjustment process on the target sample image to obtain a processed image; and determining the second sample image and the processed image as a sample image pair.

Optionally, the second network model includes a plurality of third network models resulting from training the first network model;

the processing the grayscale image corresponding to the target sample image by the second network model to obtain the second sample image includes:

processing the grayscale image by the plurality of third network models, respectively, to obtain a plurality of fifth sample images; and performing a transparency blending process on the plurality of fifth sample images to obtain the second sample image.

In a third aspect, the present disclosure provides an apparatus of generating an image with metallic texture, including: a processing module, wherein the processing module is configured to:

acquire a first video; and input the first video into a pre-trained metallic texture image generation model to obtain a second video, wherein each frame of images in the second video is an image with metallic texture;

wherein the metallic texture image generation model is trained based on a plurality of first sample images and second sample images with metallic texture corresponding to each first sample image.

Optionally, the metallic texture image generation model is trained based on a plurality of sample image pairs;

the plurality of sample image pairs are determined based on a plurality of second sample images and a plurality of target sample images;

the plurality of second sample images are determined based on the first sample image; and the first sample image is determined based on the target sample image.

Optionally, the second sample image is obtained by inputting a grayscale image corresponding to the target sample image into a second network model;

the second network model is obtained by training the first network model based on a third sample image and the grayscale image corresponding to the target sample image; and the third sample image is determined based on the first sample image.

Optionally, the third sample image is based on an alignment of second facial keypoints in the first sample image and first facial keypoints in the target sample image.

Optionally, the sample image pair is derived based on a fourth sample image and the target sample image; and the fourth sample image is obtained by fusing the second sample image and the third sample image.

Optionally, the fourth sample image is obtained by fusing the second sample image and the corresponding third sample image based on a position of a human face and a first mask image; and the position of the human face and the first mask image are obtained by performing a human face segmentation on the target sample image.

Optionally, the fourth sample image is obtained by fusing the second sample image and the corresponding third sample image based on the position of the human face and a second mask image; and the second mask image is obtained by performing a morphological manipulation process and/or a Gaussian blur process on the first mask image.

Optionally, the sample image pair is derived based on the second sample image and a processed image; and the processed image is obtained by performing an attribute information adjustment process on the target sample image.

Optionally, the second network model includes a plurality of third network models resulting from training the first network model;

the second sample image is obtained by performing a transparency blending process on a plurality of fifth sample images; and

the plurality of fifth sample images are obtained by processing the grayscale image by the plurality of third network models, respectively.

In a fourth aspect, the present disclosure provides an apparatus of training a metallic texture image generation model, including: a processing module, wherein the processing module is configured to:

determine a first sample image corresponding to each target sample image, wherein the first sample image is an image with metallic texture;

determine a second sample image corresponding to each target sample image according to the first sample image corresponding to each target sample image, wherein a difference between a position of a human face in the second sample image and a position of a human face in the corresponding target sample image is less than a preset value; and determine a plurality of sample image pairs based on each second sample image and each target sample image, and update model parameters of an initial metallic texture image generation model based on the plurality of sample image pairs to obtain the metallic texture image generation model.

Optionally, the processing module is specifically configured to:

determine, according to each first sample image, a third sample image corresponding to each first sample image, wherein a difference between a position of a human face in the third sample image and the position of the human face in the target sample image is less than a difference between a position of a human face in the first sample image and the position of the human face in the target sample image;

train a first network model according to each third sample image and a grayscale image corresponding to each target sample image to obtain a second network model; and process the grayscale image corresponding to the target sample image by the second network model to obtain the second sample image.

Optionally, the processing module is specifically configured to:

extract a plurality of first facial keypoints in the target sample image and a plurality of second facial keypoints in the first sample image, respectively; and align second facial keypoints in the first sample image with first facial keypoints in the target sample image to obtain the third sample image.

Optionally, the processing module is specifically configured to:

fuse the second sample image and the third sample image to obtain a fourth sample image; and determine the sample image pair according to the fourth sample image and the target sample image.

Optionally, the processing module is specifically configured to:

perform a human face segmentation on the target sample image to obtain a position of a human face and a first mask image; and fuse the second sample image and the corresponding third sample image according to the position of the human face and the first mask image to obtain the fourth sample image.

Optionally, the processing module is specifically configured to:

perform a morphological manipulation process and/or a Gaussian blur process on the first mask image to obtain a second mask image; and fuse the second sample image and the corresponding third sample image according to the position of the human face and the second mask image to obtain the fourth sample image.

Optionally, the processing module is specifically configured to:

perform an attribute information adjustment process on the target sample image to obtain a processed image; and determine the second sample image and the processed image as a sample image pair.

Optionally, the second network model includes a plurality of third network models resulting from training the first network model; the processing module is specifically configured to:

process the grayscale image by the plurality of third network models, respectively, to obtain a plurality of fifth sample images; and perform a transparency blending process on the plurality of fifth sample images to obtain the second sample image.

In a fifth aspect, the present disclosure provides a device for generating an image with metallic texture, including: a processor, and a memory communicatively connected with the processor;

the memory stores computer-executable instructions;

the processor executes the computer-executable instructions stored in the memory to implement the method of any one of the first aspect.

In a sixth aspect, the present disclosure provides a device of training a metallic texture image generation model, including: a processor, and a memory communicatively connected with the processor;

the memory stores computer-executable instructions;

the processor executes the computer-executable instructions stored in the memory to implement the method of any one of the second aspect.

In a seventh aspect, the present disclosure provides a computer-readable storage medium with computer-executable instructions stored thereon, wherein the computer-executable instructions, when executed by a processor, are configured to implement the method of any one of the first aspect.

In an eighth aspect, the present disclosure provides a computer-readable storage medium with computer-executable instructions stored thereon, wherein the computer-executable instructions, when executed by a processor, are configured to implement the method of any one of the second aspect.

In a ninth aspect, the present disclosure provides a computer program product, including a computer program, wherein the computer program, when executed by a processor, implements the method of any one of the first aspect.

In a tenth aspect, the present disclosure provides a computer program product, including a computer program, wherein the computer program, when executed by a processor, implements the method of any one of the second aspect.

In an eleventh aspect, the disclosure provides a computer program, wherein the computer program, when executed by a processor, implements the method of any one of the first aspect.

In a twelfth aspect, the disclosure provides a computer program, wherein the computer program, when executed by a processor, implements the method of any one of the second aspect.

The present disclosure provides a method of generating an image with metallic texture and a training method of a model. The method includes: acquiring a first video; and inputting the first video into a pre-trained metallic texture image generation model to obtain a second video, wherein each frame of images in the second video is an image with metallic texture; in which, the metallic texture image generation model is trained based on a plurality of first sample images and second sample images with metallic texture corresponding to each first sample image. In the above method, the metallic image generation model is trained based on the plurality of first sample images and second sample images with metallic texture corresponding to each of the first sample images, such that the facsimile estimation of the facial image required in the golden color rendering method based on facsimile estimation can be avoided, thus, the amount of data computation can be reduced. By inputting the first video into the metallic texture image generation model, the second video can be obtained in real time, thereby the real-time performance of obtaining the second video can be improved.

BRIEF DESCRIPTION OF DRAWINGS

The accompanying drawings, which are incorporated in and constitute a part of the specification, illustrate embodiments consistent with the present disclosure and together with the description, serve to explain the principles of the disclosure.

FIG. 1 is a schematic diagram of an application scenario provided by the present disclosure;

FIG. 2 is a flowchart illustrating a method of generating an image with metallic texture according to the present disclosure;

FIG. 3 is a flowchart illustrating a method of training a metallic texture image generation model according to the present disclosure;

FIG. 4 is a flowchart of a method of obtaining a second sample image according to the present disclosure;

FIG. 5 is a flowchart of a method of obtaining a sample image pair according to the present disclosure;

Figures 6, 7, 8:
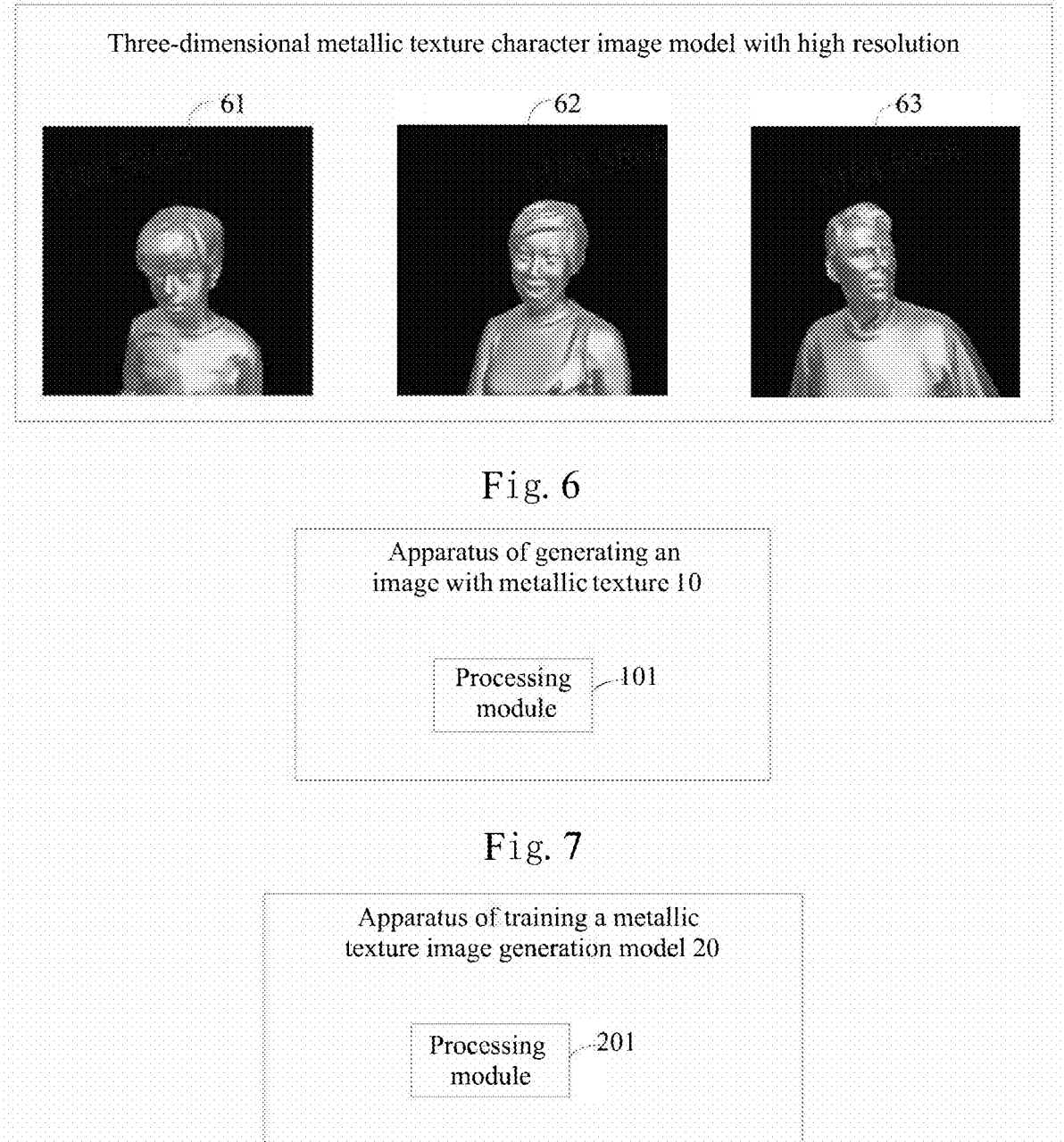
FIG. 6 is a schematic diagram of metallic texture image models with high resolution provided by the present disclosure.
FIG. 7 is a structural schematic diagram of an apparatus of generating an image with metallic texture according to the present disclosure.
FIG. 8 is a structural schematic diagram of an apparatus of training a metallic texture image generation model provided by the present disclosure.

Embodiments of the present disclosure are illustrated by the above-described drawings and will be described in more detail hereinafter. These drawings and description are not intended to limit the scope of the concept of the present disclosure in any way, but rather to illustrate the concept of the present disclosure for those skilled in the art by reference to particular embodiments.

DETAILED DESCRIPTION

Reference will now be made in detail to exemplary embodiments, examples of which are illustrated in the accompanying drawings. Where the following description refers to the drawings, unless otherwise indicated, the same reference numbers in different drawings refer to the same or similar elements. The implementation described in the following exemplary embodiments does not represent all implementation consistent with the present disclosure. Instead, they are merely examples of apparatus and methods consistent with some aspects of the present disclosure as detailed in the following claims.

In the related art, the golden color rendering method based on facsimile estimation is generally employed, which first requires facsimile estimation of the facial image and then golden rendering of the facial image based on the estimated facsimile. The golden color rendering method based on facsimile estimation requires a large amount of computation, resulting in poor real-time performance for golden rendering of images. As an example, when preforming golden rendering of a character image in a video, the video after golden rendering is stuttered.

In the present disclosure, in order to improve the real-time performance of golden rendering of character images, the inventors have conceived to design a metallic texture image generation model with low computational complexity, and after inputting a first video into the metallic texture image generation model, a second video can be quickly output, and each frame of the first sample image in the second video is an image having a metallic texture, thereby improving the real-time performance of golden rendering of character image.

An application scenario of the method of generating an image with metallic texture provided by the present disclosure is explained below in conjunction with FIG. 1.

FIG. 1 is a schematic diagram of an application scenario provided by the present disclosure. As shown in FIG. 1, including: a first video, a second video, and a metallic texture image generation model.

Multiple frames of images are included in the first video, for example the multiple frames of images include images 11, 12, 13.

Multiple frames of images are included in the second video, for example the multiple frames of images include images 21, 22, 23.

The metallic texture image generation model is used to sequentially process the images 11, 12, 13, respectively, and output the images 21, 22, 23. Image 21 is a sample image with metallic texture corresponding to image 11, image 22 is a sample image with metallic texture corresponding to image 12, and image 23 is a sample image with metallic texture corresponding to image 13.

The technical solutions of the present disclosure and how the technical solutions of the present disclosure solve the above technical problems are explained in detail next with specific embodiments. The following several specific embodiments may be combined with each other, and the same or similar concepts or processes may not be repeated in some embodiments. Embodiments of the present disclosure will be described below with reference to the accompanying drawings.

FIG. 2 is a flowchart of a method of generating an image with metallic texture provided by the present disclosure. As shown in FIG. 2, the method includes:

S201, acquiring a first video.

Alternatively, the performing body of the method of generating an image with metallic texture may be a device of generating an image with metallic texture, or may be an apparatus of generating an image with metallic texture provided in the device of generating an image with metallic texture, which may be implemented by a combination of software and/or hardware.

Alternatively, the first video may be a video captured in real time by the electronic device or may be a video pre-stored in the electronic device. X frames of images are included in the first video. X is an integer greater than or equal to 2.

S202, inputting the first video into a pre-trained metallic texture image generation model to obtain a second video. Each frame of images in the second video is an image with metallic texture, and the metallic texture image generation model is trained based on a plurality of first sample images and second sample images with metallic texture corresponding to each first sample image.

The number of images included in the second video is equal to the number of images included in the first video.

In the method of generating an image with metallic texture provided by the embodiments corresponding to FIG. 2, the metallic texture image generation model is trained based on a plurality of first sample images and second sample images with metallic texture corresponding to each first sample image, such that the facsimile estimation of the facial image required in the golden color rendering method based on facsimile estimation can be avoided, thus, the amount of data computation can be reduced. By inputting the first video into the metallic texture image generation model, the second video can be obtained in real time, thereby the real-time performance of obtaining the second video can be improved.

On the basis of the above embodiments, the method of training the metallic texture image generation model is explained below in conjunction with specific embodiments.

FIG. 3 is a flowchart illustrating a method of training a metallic texture image generation model according to the present disclosure. As shown in FIG. 3, the method includes:

S301, determining a first sample image corresponding to each target sample image, wherein the first sample image is an image with metallic texture.

Optionally, the execution body of the method of training the metallic texture image generation model may be a device of training the metallic texture image generation model, or an apparatus of training the metallic texture image generation model provided in the device of training, which may be implemented by a combination of software and/or hardware.

The device of training may be, for example, a server, and may be the device of generating described above.

The target sample image is a color image. For example, the target sample image may be an RGB image.

In some embodiments, for each target sample image, the first sample image to which the target sample image corresponds may be determined by: respectively adjusting lighting, color, and gesture angles of N three-dimensional (3D), high resolution, metallic texture character models which are rendered in advance, to generate a plurality of two-dimensional (2D) metallic texture images; training an initial metallic texture additive model with the plurality of two-dimensional (2D) metallic texture images, to obtain a metallic texture additive model; processing the target sample image by the metallic texture additive model to obtain a first sample image corresponding to the target sample image.

N is an integer greater than or equal to 2. For example, N may be 6, 7, 8, 10, or the like.

The initial metallic texture additive model may be an Agile Generative adversarial Nets (Agile-GAN) model.

For the first sample image corresponding to the target sample image, the difference in facial features between the first sample image and the target sample image is significant, but the metallic texture of the first sample image is better.

S302, determining a second sample image corresponding to each target sample image according to the first sample image corresponding to each target sample image, wherein a difference between a position of a human face in the second sample image and a position of a human face in the corresponding target sample image is less than a preset value.

Each target sample image has a corresponding second sample image.

In some embodiments, for each target sample image, a second sample image corresponding to the target sample image may be obtained as following solutions 01, 02.

Solution 01, training a first network model with the first sample image corresponding to each target sample image and the grayscale image corresponding to each target sample image to obtain a second network model; and processing the target sample image by the second network model to obtain a second sample image corresponding to the target sample image.

Solution 02, training a first network model with the first sample image corresponding to each target sample image and the grayscale image corresponding to each target sample image to obtain a second network model; performing attribute information adjustment process on the target sample image to obtain a processed image; and processing the processed image by the second network model to obtain a second sample image corresponding to the target sample image.

The first network model is the Cycle Generative adversarial Nets (Cycle-GAN) model.

Optionally, the attribute information may include any at least one of brightness, contrast, hue, resolution, blurring, and the like.

S303, determining a plurality of sample image pairs based on each second sample image and each target sample image, and updating model parameters of an initial metallic texture image generation model based on the plurality of sample image pairs to obtain the metallic texture image generation model.

In some embodiments, for each sample image pair, a target sample image and a second sample image corresponding to the target sample image are determined as a sample image pair.

In some embodiments, for each sample image pair, the target sample image is subjected to attribute information adjustment processing, resulting in a processed image. The second sample image and the processed image are determined as a sample image pair.

In the present disclosure, the target sample image is subjected to attribute information adjustment processing, resulting in a processed image; a sample image pair is obtained based on the processed images, thus, the model adaptability as well as the robustness of the metallic texture image generation model can be improved.

The initial metallic texture image generation model is a Pix2pix model.

In the method of training the metallic texture image generation model provided by the embodiments corresponding to FIG. 3, the first sample images can be made to have a better metallic texture by processing each target sample image through the metallic texture additive model to obtain the first sample image corresponding to each target sample image. In addition, a plurality of second sample images corresponding to the target sample image are determined based on the first sample images, the difference between the position of the human face in each of the second sample images and the position of the human face in the target sample image is less than a preset value, such that the second sample images and the target sample image are relatively aligned. Further, the accuracy of the metallic texture image generation model can be improved by determining a plurality of sample image pairs based on the respective second sample image and the respective target sample image, and updating the model parameters of an initial metallic texture image generation model based on the plurality of sample image pairs to obtain the metallic texture image generation model.

On the basis of the above-described embodiments, the method of obtaining a second sample image will be described with reference to FIG. 4 below.

FIG. 4 is a flowchart of a method of obtaining a second sample image according to the present disclosure. As shown in FIG. 4, the method includes:

S401, determining, according to each first sample image, a third sample image (denoted as warp_agile_image) corresponding to each first sample image.

The difference between the position of a human face in the third sample image and the position of a human face in the target sample image is smaller than the difference between the position of a human face in the first sample image and the position of a human face in the target sample image.

In some embodiments, the third sample image may be obtained by: extracting a plurality of first facial keypoints in the target sample image and a plurality of second facial keypoints in the first sample image, respectively; and aligning second facial keypoints in the first sample image with first facial keypoints in the target sample image to obtain the third sample image.

Optionally, the plurality of first facial keypoints in the target sample image may be extracted by the 3 solutions as follows.

Solution 11, performing keypoints extraction on the target sample image by the facial keypoint detection algorithm model, to obtain a plurality of first facial keypoints in the target sample image.

Solution 12: performing keypoints extraction on the target sample image by the facial keypoint detection algorithm model to obtain a plurality of facial keypoints; performing keypoints extraction on the target sample image by a pupil keypoint detection algorithm model to obtain a plurality of pupil keypoints; performing keypoints extraction on the target sample image by a facial contour keypoint detection algorithm model to obtain a plurality of facial contour keypoints; and determining a plurality of target human facial keypoints according to the plurality of facial keypoints, the plurality of pupil keypoints and the plurality of facial contour keypoints.

Alternatively, keypoints corresponding to four parts of the nose, the mouth, the eyes, and the eyebrows among the plurality of facial keypoints, as well as the plurality of pupil keypoints and the plurality of facial contour keypoints, may be determined as the plurality of target facial keypoints.

Alternatively, keypoints corresponding to five parts of the nose, the mouth, the eyes, the eyebrows, and an outline of a face (an outline of a lower half face) among the plurality of facial keypoints, as well as the plurality of pupil keypoints, and keypoints corresponding to an outline of an upper half face among the plurality of facial contour keypoints may be determined as the plurality of target facial keypoints.

Solution 13, performing keypoints extraction on the target sample image by the facial keypoint detection algorithm model to obtain a plurality of facial keypoints; performing keypoints extraction on the target sample image by a pupil keypoint detection algorithm model to obtain a plurality of pupil keypoints; performing keypoints extraction on the target sample image by a dense keypoint detection algorithm model of mouth to obtain a plurality of mouth keypoints; performing keypoints extraction on the target sample image by a facial contour keypoint detection algorithm model to obtain a plurality of facial contour keypoints; determining a plurality of target human facial keypoints according to the plurality of facial keypoints, the plurality of pupil keypoints, the plurality of mouth keypoints, and the plurality of facial contour keypoints.

Alternatively, keypoints corresponding to the three parts of the nose, the eyes and the eyebrows among the plurality of facial keypoints, as well as the plurality of pupil keypoints, the plurality of mouth keypoints and the plurality of facial contour keypoints, may be determined as the plurality of target facial keypoints.

Alternatively, keypoints corresponding to the four parts of the nose, the eyes, the eyebrows, and the contour of the face (contour of the lower half face) among the plurality of facial keypoints, as well as the plurality of pupil keypoints, the plurality of mouth keypoints and keypoints corresponding to an outline of an upper half face among the plurality of facial contour keypoints may be determined as the plurality of target facial keypoints.

Alternatively, the plurality of second facial keypoints in the first sample image may be extracted in a method similar to the solutions 11, 12, or 13, which will not be repeated here.

In some embodiments, the second facial keypoints in the first sample image and the first facial keypoints in the target sample image may be aligned by affine transformation (thin plate spline warping) to obtain a third sample image.

It should be noted that the position of the human face in the third sample image is more aligned with the position of the human face in the target sample image, resulting in a higher degree of fit.

S402, training a first network model according to each third sample image and a grayscale image corresponding to each target sample image to obtain a second network model.

S403, processing the grayscale image corresponding to the target sample image by the second network model to obtain the second sample image.

In the process of obtaining the second sample image according to the embodiments corresponding to FIG. 4, the first network model is trained on the basis of a grayscale image corresponding to each of the target sample images and the third sample images to obtain the second network model, and the second sample image is obtained by processing the grayscale image corresponding to the target sample image, such that the second sample image better retains the human face in the target sample image.

In some embodiments, the second network model includes a plurality of third network models resulting from training the first network model. The above S403 specifically includes: processing the grayscale image by the plurality of third network models, respectively, to obtain a plurality of fifth sample images; and performing a transparency blending process (alpha-blending) on the plurality of fifth sample images to obtain the second sample image.

It should be noted that the second sample image and the target sample image are relatively aligned, but are generally less metallic, thus, the sample image pair is obtained based on the third sample image, which is more metallic, on the basis of the relatively aligned face features of the second sample image and the target sample image.

On the basis of the above-described embodiments, the method of obtaining a sample image pair will now be described with reference to FIG. 5, and in particular, embodiments corresponding to FIG. 5 can be referred to.

FIG. 5 is a flowchart of a method of obtaining a sample image pair according to the present disclosure. As shown in FIG. 5, the method includes:

S501, fusing the second sample image corresponding to the target sample image and the third sample image to obtain a fourth sample image (denoted as final_target_image).

In some embodiments, S501 specifically includes: performing a human face segmentation on the target sample image to obtain a position of a human face and a first mask image; and fusing the second sample image (denoted as cycle_image) and the corresponding third sample image according to the position of the human face and the first mask image to obtain the fourth sample image.

Here, the first mask image is a mask image corresponding to a human face.

In the present disclosure, since the human face in the second sample image is better and the metallic texture of the third sample image is better, it is possible to acquire the human face from the second sample image according to the first mask image and the position of the human face; and acquire other images than the above human face from the third sample image corresponding to the second sample image, and combine the human face and the other images to obtain the fourth sample image.

In some embodiments, merging the second sample image and the corresponding third sample image according to the position of the human face and the first mask image to obtain the fourth sample image includes: performing a morphological manipulation process and/or a Gaussian blur process on the first mask image to obtain a second mask image; and merging the second sample image and the corresponding third sample image according to the position of the human face and the second mask image to obtain the fourth sample image.

In the present disclosure, the first mask image is subjected to the morphological manipulation process and/or the Gaussian blur process to obtain the second mask image; and the fourth sample image is obtained according to the position of the human face and the second mask image.

In some embodiments, the morphological manipulation process includes Dilation and Erosion.

S502, determining the sample image pair according to the fourth sample image and the target sample image.

In some embodiments, the fourth sample image and the target sample image may be determined as a sample image pair.

In some embodiments, the target sample image is subjected to attribute information adjustment process, resulting in a processed image; and
  the fourth sample image and the processed image are determined as the sample image pair.

In the embodiments corresponding to FIG. 5, the second sample image and the third sample image corresponding to the target sample image are fused to obtain the fourth sample image, such that the facial similarity between the fourth sample image and the target sample image, as well as the metallic texture of the facial image in the fourth sample image can be improved.

It is to be noted that, in the process of adjusting the attribute information of the image according to the present disclosure, it is also possible to change the color of the hair in the image according to the hair mask image of the target sample image to which the image corresponds, such that the initial metallic texture image generation model can learn the color of the hair under variable conditions, it is no longer limited to a single black color to generate the image, thus, the model adaptability as well as the robustness of the metallic texture image generation model can be improved.

Optionally, image noise may also be added in the image after the attribute information adjustment is performed on the image, or before, letting the initial metallic texture image generation model learn the sample image pair under extreme conditions to further improve the adaptation capability and robustness of the metallic texture image generation model.

FIG. 6 is a schematic diagram of metallic texture image models with high resolution provided by the present disclosure. As shown in FIG. 6, three-dimensional metallic texture image models with high resolution 61, 62, 63 are included.

FIG. 7 is a structural schematic diagram of an apparatus of generating an image with metallic texture according to the present disclosure. As shown in FIG. 7, the apparatus of generating an image with metallic texture 10 includes a processing module 101. The processing module 101 is configured to:
  acquire a first video; and
  input the first video into a pre-trained metallic texture image generation model to obtain a second video, wherein each frame of images in the second video is an image with metallic texture;
  wherein the metallic texture image generation model is trained based on a plurality of first sample images and second sample images with metallic texture corresponding to each first sample image.

The apparatus of generating an image with metallic texture 10 provided by the present disclosure can perform the above method of generating an image with metallic texture, its implementation principles as well as beneficial effects are similar, which will not be repeated here.

Optionally, the metallic texture image generation model is trained based on a plurality of sample image pairs;
  the plurality of sample image pairs are determined based on a plurality of second sample images and a plurality of target sample images;
  the plurality of second sample images are determined based on the first sample image; and
  the first sample image is determined based on the target sample image.

Optionally, the second sample image is obtained by inputting a grayscale image corresponding to the target sample image into a second network model;
  the second network model is obtained by training the first network model based on a third sample image and the grayscale image corresponding to the target sample image; and
  the third sample image is determined based on the first sample image.

Optionally, the third sample image is based on an alignment of second facial keypoints in the first sample image and first facial keypoints in the target sample image.

Optionally, the sample image pair is derived based on a fourth sample image and the target sample image; and the fourth sample image is obtained by fusing the second sample image and the third sample image.

Optionally, the fourth sample image is obtained by fusing the second sample image and the corresponding third sample image based on a position of a human face and a first mask image; and the position of the human face and the first mask image are obtained by performing a human face segmentation on the target sample image.

Optionally, the fourth sample image is obtained by fusing the second sample image and the corresponding third sample image based on the position of the human face and a second mask image; and the second mask image is obtained by performing a morphological manipulation process and/or a Gaussian blur process on the first mask image.

Optionally, the sample image pair is derived based on the second sample image and a processed image; and the processed image is obtained by performing an attribute information adjustment process on the target sample image.

Optionally, the second network model includes a plurality of third network models resulting from training the first network model;

the second sample image is obtained by performing a transparency blending process on a plurality of fifth sample images; and the plurality of fifth sample images are obtained by processing the grayscale image by the plurality of third network models, respectively.

The apparatus of generating an image with metallic texture 10 provided by the present disclosure can perform the above method of generating an image with metallic texture, its implementation principles as well as beneficial effects are similar, which will not be repeated here.

FIG. 8 is a structural schematic diagram of an apparatus of training a metallic texture image generation model provided by the present disclosure. As shown in FIG. 8, the apparatus of training a metallic texture image generation model 20 includes: a processing module 201. The processing module 201 is configured to:

determine a first sample image corresponding to each target sample image, wherein the first sample image is an image with metallic texture;

determine a second sample image corresponding to each target sample image according to the first sample image corresponding to each target sample image, wherein a difference between a position of a human face in the second sample image and a position of a human face in the corresponding target sample image is less than a preset value; and determine a plurality of sample image pairs based on each second sample image and each target sample image, and update model parameters of an initial metallic texture image generation model based on the plurality of sample image pairs to obtain the metallic texture image generation model.

The apparatus of training a metallic texture image generation model 20 provided by the present disclosure can perform the above method of training a metallic texture image generation model, its implementation principles as well as beneficial effects are similar, which are not repeated here.

Optionally, the processing module is specifically configured to:

determine, according to each first sample image, a third sample image corresponding to each first sample image, wherein a difference between a position of a human face in the third sample image and the position of the human face in the target sample image is less than a difference between a position of a human face in the first sample image and the position of the human face in the target sample image;

train a first network model according to each third sample image and a grayscale image corresponding to each target sample image to obtain a second network model; and process the grayscale image corresponding to the target sample image by the second network model to obtain the second sample image.

Optionally, the processing module is specifically configured to:

extract a plurality of first facial keypoints in the target sample image and a plurality of second facial keypoints in the first sample image, respectively; and align second facial keypoints in the first sample image with first facial keypoints in the target sample image to obtain the third sample image.

Optionally, the processing module is specifically configured to:

fuse the second sample image and the third sample image to obtain a fourth sample image; and determine the sample image pair according to the fourth sample image and the target sample image.

Optionally, the processing module is specifically configured to:

perform a human face segmentation on the target sample image to obtain a position of a human face and a first mask image; and fuse the second sample image and the corresponding third sample image according to the position of the human face and the first mask image to obtain the fourth sample image.

Optionally, the processing module is specifically configured to:

perform a morphological manipulation process and/or a Gaussian blur process on the first mask image to obtain a second mask image; and fuse the second sample image and the corresponding third sample image according to the position of the human face and the second mask image to obtain the fourth sample image.

Optionally, the processing module is specifically configured to:

perform an attribute information adjustment process on the target sample image to obtain a processed image; and determine the second sample image and the processed image as a sample image pair.

Optionally, the second network model includes a plurality of third network models resulting from training the first network model; the processing module is specifically configured to:

process the grayscale image by the plurality of third network models, respectively, to obtain a plurality of fifth sample images; and perform a transparency blending process on the plurality of fifth sample images to obtain the second sample image.

The apparatus of training a metallic texture image generation model 20 provided by the present disclosure can perform the above method of training a metallic texture image generation model, its implementation principles as well as beneficial effects are similar, which are not repeated here.

Figures 9, 10:
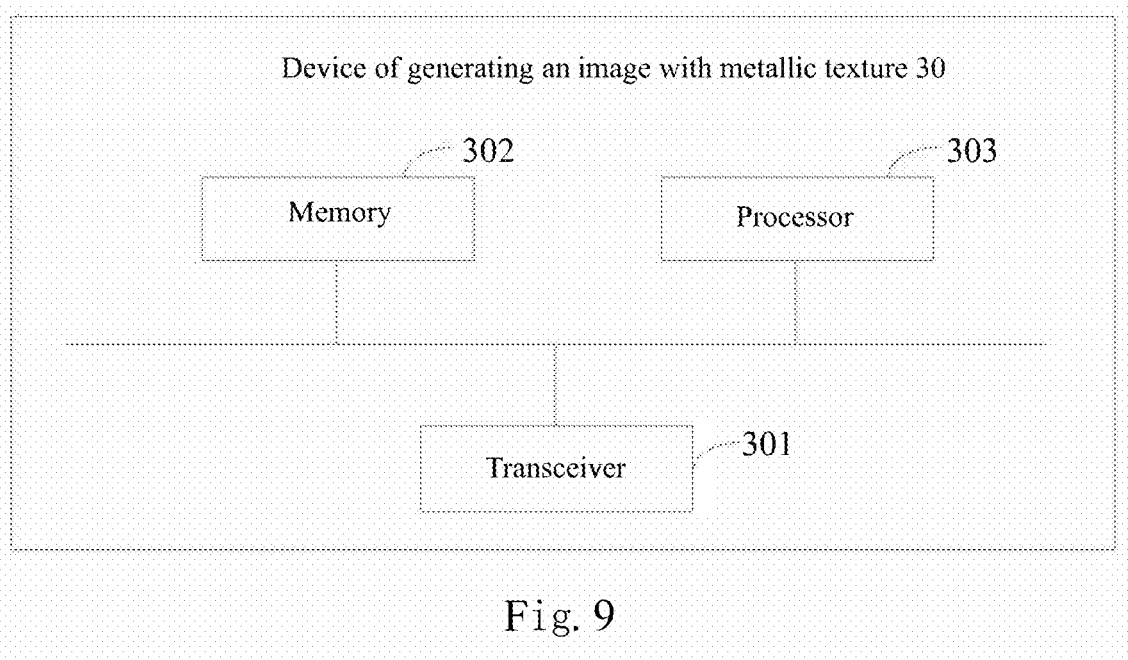
FIG. 9 is a hardware schematic diagram of a device for generating an image with metallic texture according to the present disclosure.
FIG. 10 is a hardware schematic diagram of a device of training a metallic texture image generation model provided by the present disclosure.

FIG. 9 is a hardware schematic diagram of a device for generating an image with metallic texture provided by the present disclosure. As shown in FIG. 9, the device for generating an image with metallic texture 30 may include: a transceiver 301, a memory 302, and a processor 303.

Therein, the transceiver 301 may include: a transmitter and/or a receiver. A transmitter may also be referred to as a sending device, transmission device, transmission port or transmission interface, and like descriptions. The receiver may also be referred to as a receiving device, receive port, or receive interface, among similar descriptions.

Exemplarily, the parts of the transceiver 301, the memory 302, the processor 303 are interconnected by a bus.

The memory 302 is used to store computer-executable instructions.

The processor 303 is configured to execute the computer-executed instructions stored by the memory 302, so that the processor 303 performs the above-described method of generating the image with metallic texture.

FIG. 10 is a hardware schematic diagram of a device of training a metallic texture image generation model provided by the present disclosure. As shown in FIG. 10, the device of training a metallic texture image generation model may include: a transceiver 401, a memory 402, and a processor 403.

Therein, the transceiver 401 may include: a transmitter and/or a receiver. A transmitter may also be referred to as a sending device, transmission device, transmission port or transmission interface, and like descriptions. The receiver may also be referred to as a receiving device, receive port, or receive interface, among similar descriptions.

Exemplarily, portions of the transceiver 401, the memory 402, the processor 403 are interconnected by a bus.

The memory 402 is used to store computer-executable instructions.

The processor 403 is used to execute the computer-executed instructions stored by the memory 402, so that the processor 403 performs the method of training the metallic texture image generation model described above.

The present disclosure provides a computer-readable storage medium with computer-executable instructions stored thereon, wherein the computer-executable instructions, when executed by a processor, are configured to implement the method of method of generating an image with metallic texture.

The present disclosure provides a computer-readable storage medium with computer-executable instructions stored thereon, wherein the computer-executable instructions, when executed by a processor, are configured to implement the method of training a metallic texture image generation model.

The present disclosure also provides a computer program product, including a computer program, wherein the computer program, when executed by a processor, implements the method of method of generating an image with metallic texture.

The present disclosure also provides a computer program product, including a computer program, wherein the computer program, when executed by a processor, implements the method of training a metallic texture image generation model.

The present disclosure also provides a computer program, wherein the computer program, when executed by a processor, implements the method of method of generating an image with metallic texture.

The present disclosure also provides a computer program, wherein the computer program, when executed by a processor, implements the method of training a metallic texture image generation model.

All or part of the steps of implementing the above-described method embodiments may be carried out by hardware associated with program instructions. The aforementioned program may be stored in a readable memory. The program, when executed, performs steps including the above-described method embodiments. The aforementioned memory (storage medium) includes read-only memory (ROM), random access memory (RAM), flash memory, hard disk, solid state drive, magnetic tape, floppy disk, optical disc, and any combination thereof.

The present disclosure is described with reference to flowchart illustrations and/or block diagrams of methods, apparatus (systems), and computer program products according to the present disclosure. It should be understood that each flow and/or block in the flowchart illustrations and/or block diagrams, and combinations of the flows and/or blocks in the flowchart illustrations and/or block diagrams can be realized by computer program instructions. These computer program instructions may be provided to a processing unit of a general-purpose computer, a special purpose computer, an embedded processor, or other programmable data processing devices for producing a machine, such that the instructions, which are executed by the processing unit of the computer or other programmable data processing devices, produce apparatus means for implementing the functions specified in the flowchart flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including apparatus instructions which implement the functions specified in the flowchart process or processes and/or block diagram block or blocks.

These computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart process or processes and/or block diagram block or blocks.

It will be apparent to those skilled in the art that various modifications and variations can be made to the disclosed embodiments without departing from the spirit and scope of the present disclosure. Thus, the present disclosure is intended to cover such modifications and variations of the embodiments of the present disclosure provided they come within the scope of the claims of the present disclosure and their equivalents.

In this disclosure, the term "include" and variations thereof may refer to non-limiting inclusion; The term "or" and its variants may mean "and/or." The terms "first", "second", and the like in this disclosure are used for distinguishing between similar objects and not necessarily for describing a particular sequential or chronological order. In the present disclosure, a "plurality" means two or more than two. "And/or", describing an association relationship of an associated object, means that three kinds of relationships may exist, for example, A and/or B may mean that there are three situations: A exists alone, A and B exist simultaneously, and B exists alone. The character "/" generally indicates that the contextual object is an "or" relationship.

Other embodiments of the disclosure will be apparent to those skilled in the art from consideration of the specification and practice of the invention disclosed herein. This disclosure is intended to cover any variations, uses, or adaptations of the disclosure following the general principles of the disclosure and including common general knowledge or customary practice in the art to which the disclosure is not disclosed. It is intended that the specification and examples be considered as exemplary only, with a true scope and spirit of the disclosure being indicated by the following claims.

It should be understood that the present disclosure is not limited to the precise construction that has been described above and illustrated in the accompanying drawings, and that various modifications and changes may be made without departing from the scope thereof. The scope of the present disclosure is limited only by the following claims.

What is claimed is:

1. A method of generating an image with metallic texture, comprising:

acquiring a first video; and inputting the first video into a pre-trained metallic texture image generation model to obtain a second video, wherein each frame of images in the second video is an image with metallic texture;

wherein the metallic texture image generation model is obtained by updating model parameters of an initial model based on a plurality of sample image pairs, the plurality of sample image pairs are determined based on a plurality of second sample images and a plurality of target sample images, and the plurality of second sample images are determined based on a plurality of first sample images with metallic texture, wherein the plurality of first sample images are determined based on the plurality of target sample images, and wherein a difference between a position of a human face in each of the plurality of second sample images and a position of a human face in a corresponding target sample image among the plurality of target sample images is less than a preset value.

2. The method according to claim 1, wherein each second sample image is obtained by inputting a grayscale image corresponding to a target sample image into a second network model;

the second network model is obtained by training a first network model based on a third sample image and the grayscale image corresponding to the target sample image; and the third sample image is determined based on a first sample image, and wherein the third sample image is based on an alignment of second facial keypoints in the first sample image and first facial keypoints in the target sample image.

3. The method according to claim 2, wherein the sample image pair is derived based on a fourth sample image and the target sample image; and the fourth sample image is obtained by fusing the second sample image and the third sample image, and wherein the fourth sample image is obtained by fusing the second sample image and the corresponding third sample image based on a position of a human face and a first mask image; and the position of the human face and the first mask image are obtained by performing a human face segmentation on the target sample image.

4. The method according to claim 3, wherein the fourth sample image is obtained by fusing the second sample image and the corresponding third sample image based on the position of the human face and a second mask image; and the second mask image is obtained by performing a morphological manipulation process and/or a Gaussian blur process on the first mask image.

5. The method according to claim 1, wherein each sample image pair is derived based on a second sample image and a processed image; and the processed image is obtained by performing an attribute information adjustment process on a target sample image.

6. The method according to claim 2, wherein the second network model comprises a plurality of third network models resulting from training the first network model;

the second sample image is obtained by performing a transparency blending process on a plurality of fifth sample images; and the plurality of fifth sample images are obtained by processing the grayscale image by the plurality of third network models, respectively.

7. A non-transitory computer-readable storage medium with computer-executable instructions stored thereon, wherein the computer-executable instructions, when executed by a processor, are configured to implement the method of claim 1.

8. A method of training a metallic texture image generation model, comprising:

determining a first sample image corresponding to each target sample image, wherein the first sample image is an image with metallic texture;

determining a second sample image corresponding to each target sample image according to the first sample image corresponding to each target sample image, wherein a difference between a position of a human face in the second sample image and a position of a human face in the corresponding target sample image is less than a preset value; and determining a plurality of sample image pairs based on each second sample image and each target sample image, and updating model parameters of an initial metallic texture image generation model based on the plurality of sample image pairs to obtain the metallic texture image generation model.

9. The method according to claim 8, wherein determining the second sample image corresponding to the target sample image according to the first sample image comprises:

determining, according to each first sample image, a third sample image corresponding to each first sample image, wherein a difference between a position of a human face in the third sample image and the position of the human face in the target sample image is less than a difference between a position of a human face in the first sample image and the position of the human face in the target sample image;

training a first network model according to each third sample image and a grayscale image corresponding to each target sample image to obtain a second network model; and processing the grayscale image corresponding to the target sample image by the second network model to obtain the second sample image.

10. The method according to claim 9, wherein determining, according to the first sample image, the third sample image corresponding to the first sample image comprises:

extracting a plurality of first facial keypoints in the target sample image and a plurality of second facial keypoints in the first sample image, respectively; and aligning second facial keypoints in the first sample image with first facial keypoints in the target sample image to obtain the third sample image.

11. The method according to claim 9, wherein determining the sample images pairs based on the second sample image and the target sample image comprises:

fusing the second sample image and the third sample image to obtain a fourth sample image; and determining the sample image pair according to the fourth sample image and the target sample image.

12. The method according to claim 11, wherein the fusing the second sample image and the third sample image to obtain the fourth sample image comprises:

performing a human face segmentation on the target sample image to obtain a position of a human face and a first mask image; and fusing the second sample image and the corresponding third sample image according to the position of the human face and the first mask image to obtain the fourth sample image, and wherein the fusing the second sample image and the corresponding third sample image according to the position of the human face and the first mask image to obtain the fourth sample image comprises:

performing a morphological manipulation process and/or a Gaussian blur process on the first mask image to obtain a second mask image; and fusing the second sample image and the corresponding third sample image according to the position of the human face and the second mask image to obtain the fourth sample image.

13. The method according to claim 8, wherein determining the sample image pair based on the second sample image and the target sample image comprises:

performing an attribute information adjustment process on the target sample image to obtain a processed image; and determining the second sample image and the processed image as a sample image pair.

14. The method according to claim 9, wherein the second network model comprises a plurality of third network models resulting from training the first network model; wherein the processing the grayscale image corresponding to the target sample image by the second network model to obtain the second sample image comprises:

processing the grayscale image by the plurality of third network models, respectively, to obtain a plurality of fifth sample images; and performing a transparency blending process on the plurality of fifth sample images to obtain the second sample image.

15. A device of training a metallic texture image generation model, comprising: a processor, and a memory communicatively connected with the processor; wherein the memory stores computer-executable instructions;

the processor executes the computer-executable instructions stored in the memory to implement the method of claim 8.

16. A non-transitory computer-readable storage medium with computer-executable instructions stored thereon, wherein the computer-executable instructions, when executed by a processor, are configured to implement the method of claim 8.

17. A device for generating an image with metallic texture, comprising: a processor, and a memory communicatively connected with the processor, wherein the memory stores computer-executable instructions;

wherein the instructions upon execution by the processor, cause the processor to:

acquire a first video; and input the first video into a pre-trained metallic texture image generation model to obtain a second video, wherein each frame of images in the second video is an image with metallic texture, wherein the metallic texture image generation model is obtained by updating model parameters of an initial model based on a plurality of sample image pairs, the plurality of sample image pairs are determined based on a plurality of second sample images and a plurality of target sample images, and the plurality of second sample images are determined based on a plurality of first sample images with metallic texture, wherein the plurality of first sample images are determined based on the plurality of target sample images, and wherein a difference between a position of a human face in each of the plurality of second sample images and a position of a human face in a corresponding target sample image among the plurality of target sample images is less than a preset value.

18. The device according to claim 17, wherein each second sample image is obtained by inputting a grayscale image corresponding to a target sample image into a second network model;

the second network model is obtained by training a first network model based on a third sample image and the grayscale image corresponding to the target sample image; and the third sample image is determined based on a first sample image, and wherein the third sample image is based on an alignment of second facial keypoints in the first sample image and first facial keypoints in the target sample image.

19. The device according to claim 17, wherein each second sample image is obtained by inputting a grayscale image corresponding to a target sample image into a second network model;

the second network model is obtained by training a first network model based on a third sample image and the grayscale image corresponding to the target sample image; and the third sample image is determined based on a first sample image, and wherein the third sample image is based on an alignment of second facial keypoints in the first sample image and first facial keypoints in the target sample image.

20. The device according to claim 17, wherein each sample image pair is derived based on a second sample image and a processed image; and the processed image is obtained by performing an attribute information adjustment process on a target sample image corresponding to the second sample image.

\* \* \* \* \*